May 17, 1966     O. B. CHARLTON     3,252,066
CONTROL OF DYNAMO-ELECTRIC MACHINES
Filed July 19, 1962                                9 Sheets-Sheet 6

Fig.6.

INVENTOR
OSWALD BROWNE CHARLTON
By: Norris & Bateman, Attys

May 17, 1966

O. B. CHARLTON 3,252,066

CONTROL OF DYNAMO-ELECTRIC MACHINES

Filed July 19, 1962

INVENTOR
OSWALD BROWNE CHARLTON
By: Norris + Bateman, Attys

Fig. 8.

INVENTOR
OSWALD BROWNE CHARLTON
By: Norris + Bateman, Attys 3,252,066
CONTROL OF DYNAMO-ELECTRIC MACHINES
Oswald Browne Charlton, Hillmorton, Rugby, England, assignor to Associated Electrical Industries Limited, London, England, a company of Great Britain
Filed July 19, 1962, Ser. No. 210,991
Claims priority, application Great Britain, Aug. 31, 1961, 31,373/61
10 Claims. (Cl. 318—197)

This invention relates to dynamo-electric machines and in particular to arrangements for controlling induction machines.

Known arrangements for controlling induction motors, for example, in particular their speed, include various forms of shunt or series alternating current commutator motors in which, when the motor is operating at slip $s$ from an alternating current supply system of frequency $f$, a commutator and associated brushgear connected between the supply system and the secondary winding of the induction motor effects frequency conversion between currents at frequency $sf$ in the secondary winding and at frequency $f$ in the supply system. Alternatively auxiliary machines may incorporate commutators and brushgear for effecting this frequency conversion as in the Scherbius scheme for example, or the alternating currents at one frequency are converted into direct current by an auxiliary machine or rectifier and then from direct current to alternating current at the other frequency in an additional auxilary machine as in the Kramer scheme.

According to the present invention, an arrangement for controlling an induction machine without the use of a commutator which carries the secondary current of the machine, comprises means for controlling the transfer of power and reactive volt-amperes between the secondary winding of the induction machine and an alternating current system of frequency $f$ to which the primary winding of the induction machine will be connected, said means comprising a plurality of static electronic (for example semi-conductor) switching devices connected between the secondary winding and the supply system as a frequency converting circuit, timing means for controlling sequential switching of said devices in dependence on the speed of the machine whereby to effect frequency conversion between the supply system frequency $f$ and the frequency $sf$ of the current in the secondary winding (where $s$ is the slip), control means for adjusting the magnitude of the voltage at the terminals of the secondary winding according to the required direction of power transfer and for determining the phase of this voltage according to the required direction of transfer of reactive volt-amperes. The control means may or may not include separate means for independent control of the magnitude and phase.

The connections and control of the static switching devices are arranged so that at any instant the current in a secondary phase of the induction machine flows between this phase and a phase of the alternating current system having an instantaneous voltage such that transfer of power and reactive volt-amperes takes place in the direction required, the switching devices being operated in the sequence necessary to maintain this condition under control of a timing device which may be driven by the machine shaft, or may be synchronized with the machine shaft using selsyns for instance or may be an independent electronic timer synchronized at intervals of, for example, one revolution of the machine shaft. The voltage magnitude and phase adjusting means may be separate from the machine or may incorporate one or more auxiliary windings in the induction machine itself or make use of tappings in the normal machine windings.

In order that the invention may be fully understood reference will now be made to the accompanying drawings in which:

FIG. 9 illustrates a specific arrangement of the switching devices and the timing control means, and FIG. 10 schematically illustrates a suitable form of timing means driven from the rotor of the motor.

Figure 1:
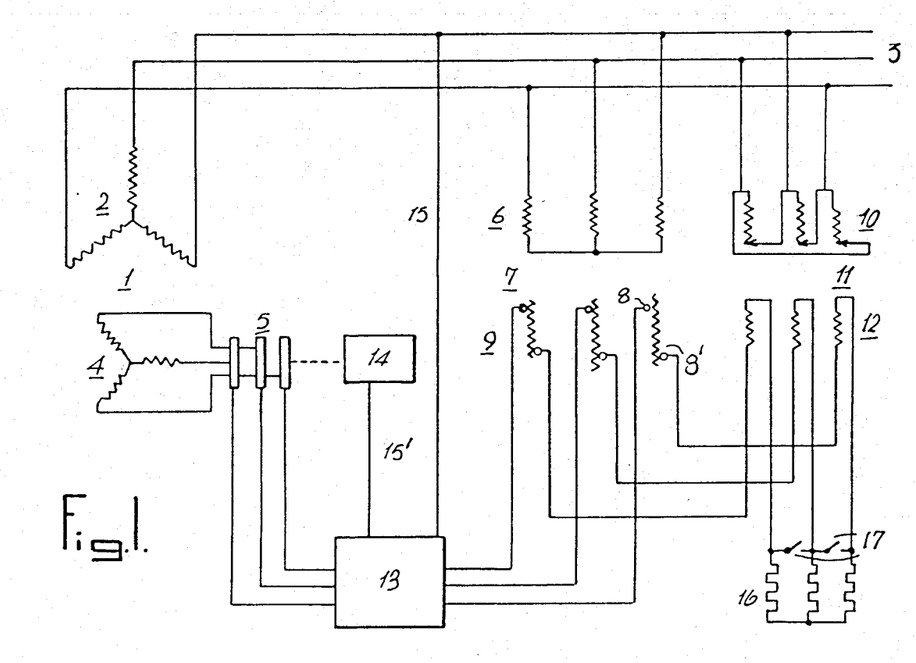
FIGS. 1–8 inclusive are circuit diagrams illustrating various induction motor control arrangements embodying the invention, the frequency converting means constituted by static electronic switching devices being represented only in block form as is also the timing means for controlling the sequential switching of these devices.
Figures 9, 10:
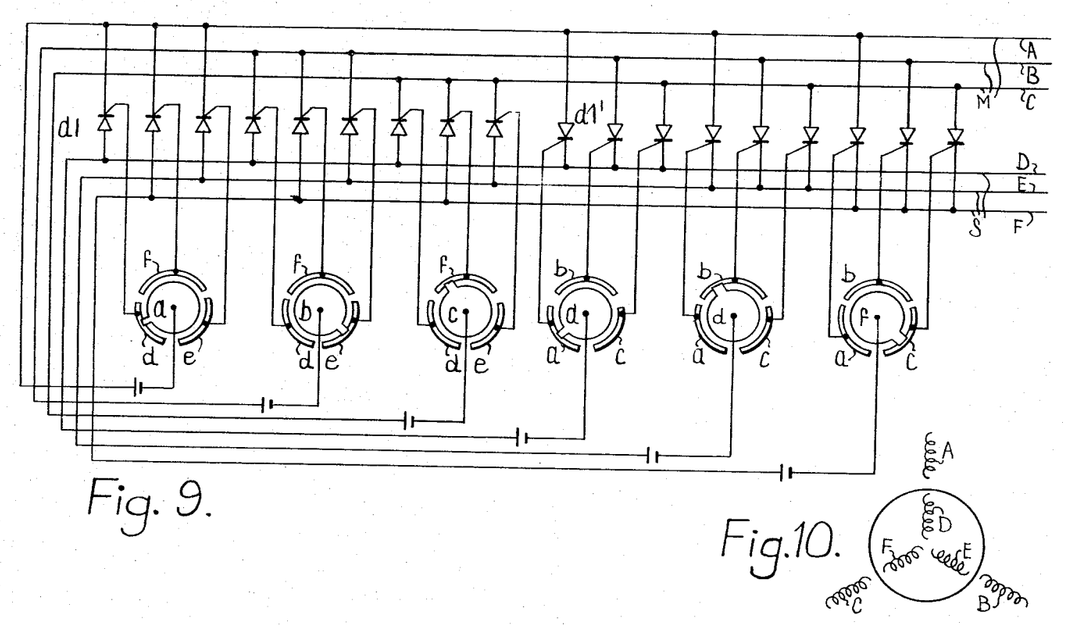

Referring to FIG. 1 of the drawings, a 3-phase slipring induction motor 1 has its primary winding 2 located on the stator and supplied at frequency $f$ from a 3-phase supply system 3, and a 3-phase secondary winding 4 located on the rotor and connected to the sliprings 5. The primary winding 6 of a variable-ratio transformer 7 is connected to the 3-phase system 3, and each coil of the secondary winding 9 of this transformer has a pair of moving tapping contacts 8 and 8' so constructed that movement of one contact along the coil is accompanied by equal and opposite movement of the other contact along the same coil. The magnitude of the voltage at the sliprings 5, and hence the speed of the motor 1, is varied by adjustment of the position of contacts 8 and 8'. The primary winding 10 of voltage injecting auxiliary transformer 11 is connected to the 3-phase system 3 and the secondary winding 12 of this auxiliary transformer is connected in series with that part of winding 9 between contacts 8 and 8' of the several coils. The primary winding 10 has tappings enabling the voltage in the secondary winding 12 to be pre-selected. The connections of and to the primary windings of transformer 7 and 11 are arranged so that their secondary voltages are in phase quadrature. Between the secondary winding 9 of transformer 7 and the sliprings 5 is connected by means of slip frequency connections M and supply frequency connections S a frequency converting circuit 13 which comprises a bank of controlled semi-conductor switching devices so arranged, for instance in the manner illustrated in FIG. 9, that current flow can be permitted in either direction between any phase of transformer 7 and any slipring by rendering the appropriate switching device conductive. The frequency and sequence of operation of the switching devices are co-related to the motor speed and to the frequency of the alternating current system 3, for which purpose connections indicated schematically by the single lines 15 are taken to the circuit 13 from the supply system 3 and from a timing device 14 which is coupled to the motor shaft and may take various forms of which one example is illustrated in FIG. 9. Resistance 16, short-circuited when running by switch 17, is provided to limit the current at starting to a safe value.

Various modifications may be made to the arrangement of FIG. 1 as have been illustrated in FIGS. 2–8, in which elements already described in FIG. 1 have the same reference numerals as before.

Figure 2:
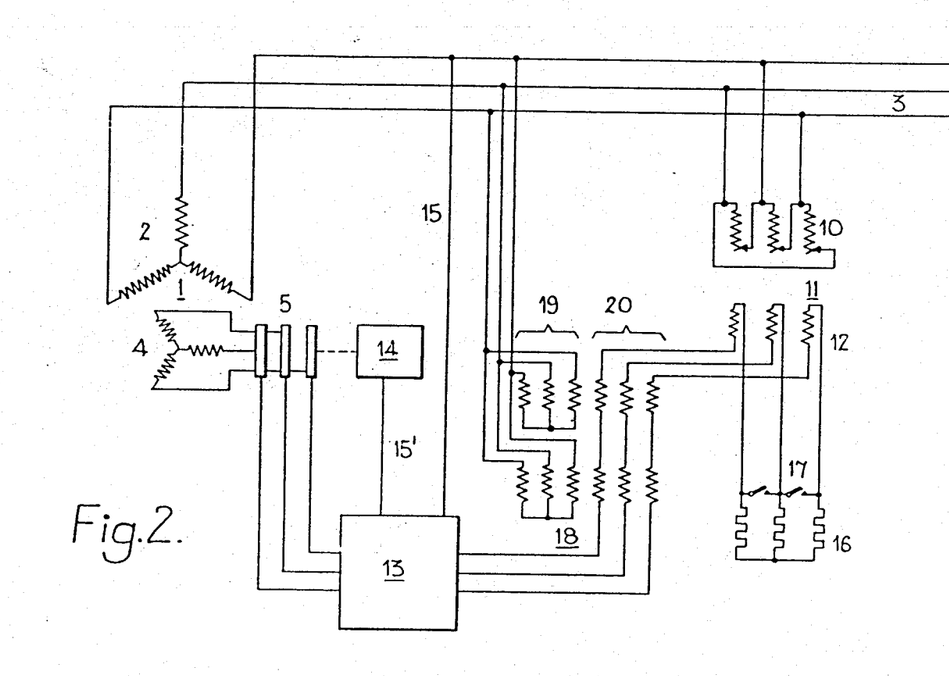
Figure 3:
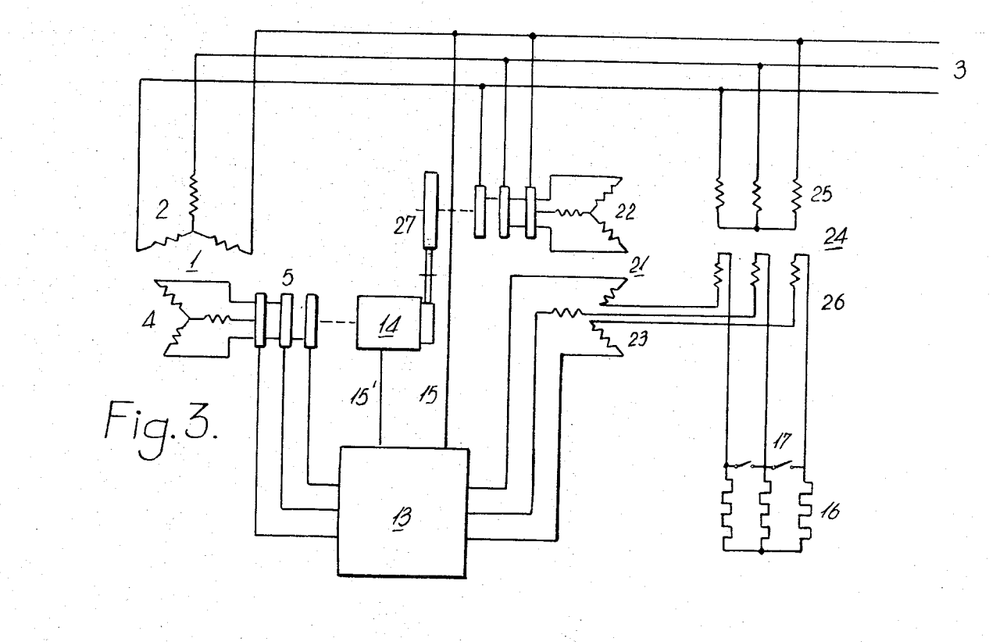
Figure 4:
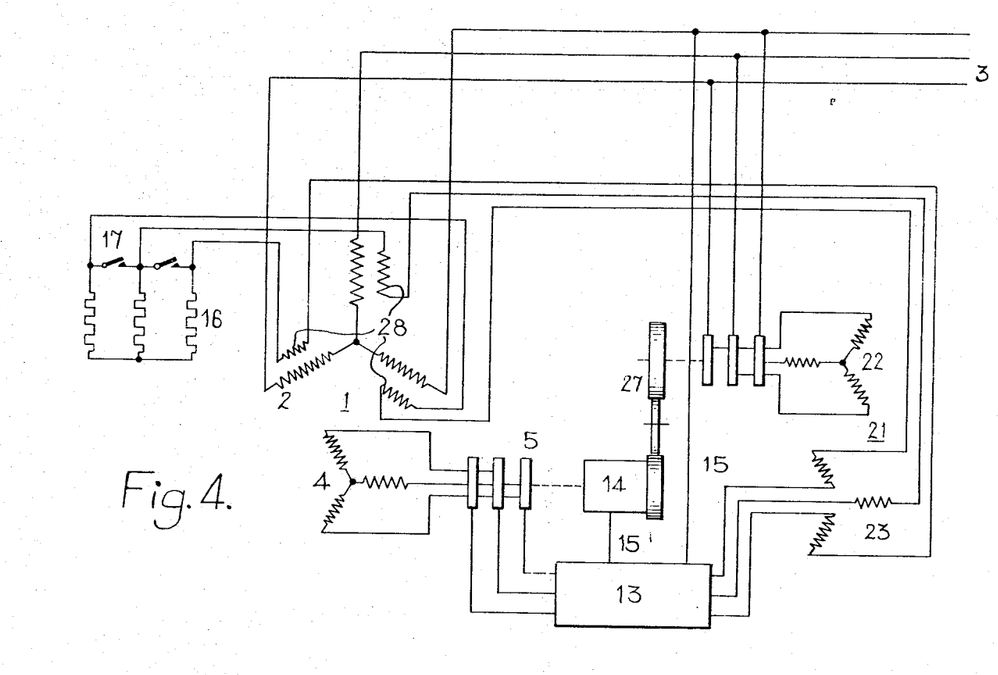

In FIG. 2, the variable ratio transformer 7 has been replaced by a double induction regulator 18 having primary windings 19 and secondary windings 20, this regulator being so constructed in known manner that the magnitude of the secondary voltage can be changed without change of phase. Alternatively the variable ratio transformers 7 and 11 in FIG. 1 may be replaced by a single induction regulator and a fixed ratio transformer as illustrated in FIG. 3, in which the single induction regulator is represented at 21 with its primary winding 22 and secondary winding 23, while the fixed ratio transformer is represented at 24 with its primary winding 25 and secondary winding 26. Adjustment of the rotor position of the regulator 21 causes a change in magnitude of the resultant voltage of the two secondary windings 23 and 26 as applied to the converter 13, this change in magnitude being accompanied by a change in phase which is compensated by simultaneous adjustment of the phase of the timing device 14 for instance by rotating it independently of the motor 1 through the train of gears 27 from the shaft of the induction regulator 21. Another alternative is shown in FIG. 4 in which the variable ratio transformer 7 is again replaced by a single induction regulator 21 which in this instance acts in conjunction with an auxiliary winding 28 provided on the same part of the motor (namely its stator for the connections assumed for these embodiments) as is the primary winding 2, being in the same slots as this primary winding: this auxiliary winding 28 serves the same function as the voltage injecting transformer 24 of FIG. 3 and may itself be dispensed with by connecting the secondary winding 23 of regulator 21 to suitable tapping points on the motor primary winding 1.

Figure 5:
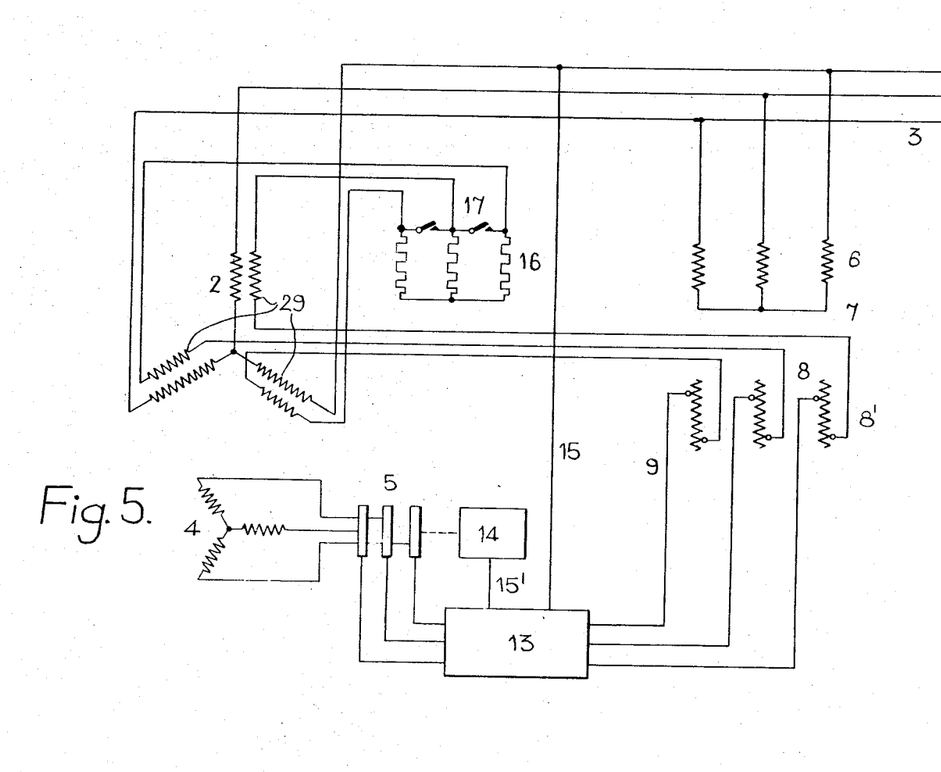

The auxiliary variable transformer 11 of FIG. 1 may as shown in FIG. 5 be replaced by an auxiliary winding 29 again provided on the induction motor 1 in the same slots as its primary winding 2. The auxiliary transformer 11 or its substitute auxiliary winding 29 may be connected so that its secondary voltage is at some angle other than phase quadrature to the secondary voltage of the variable ratio transformer 7 or its substitutes. In some circumstances the auxiliary transformer 11 or its substitutes can be omitted.

Figure 6:
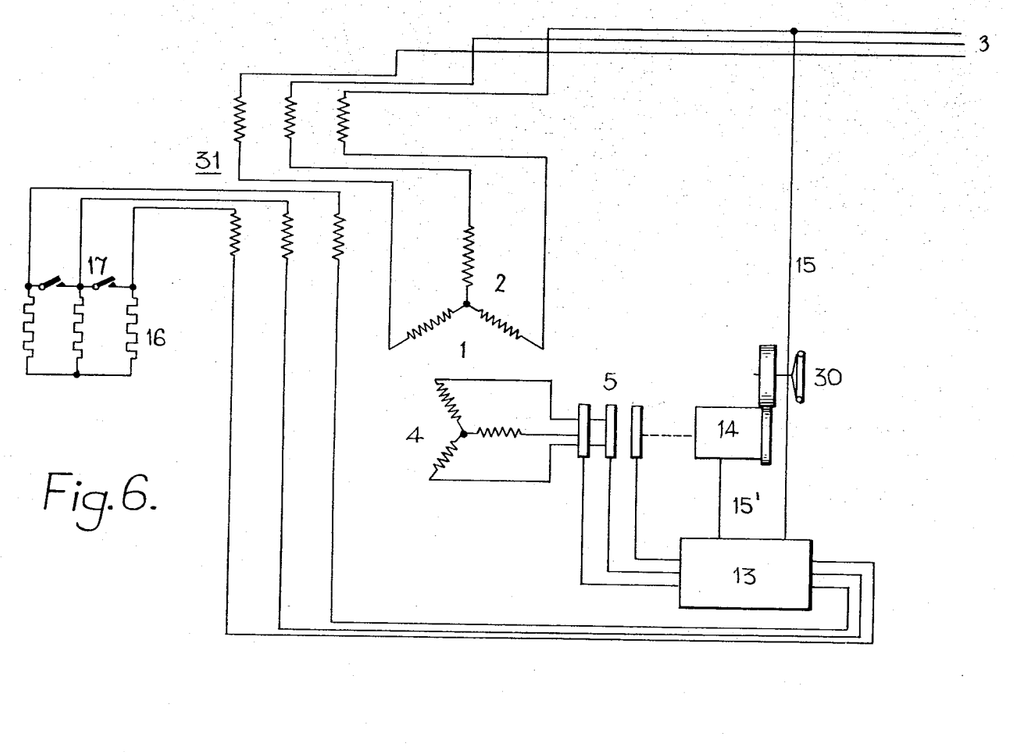
Figure 7:
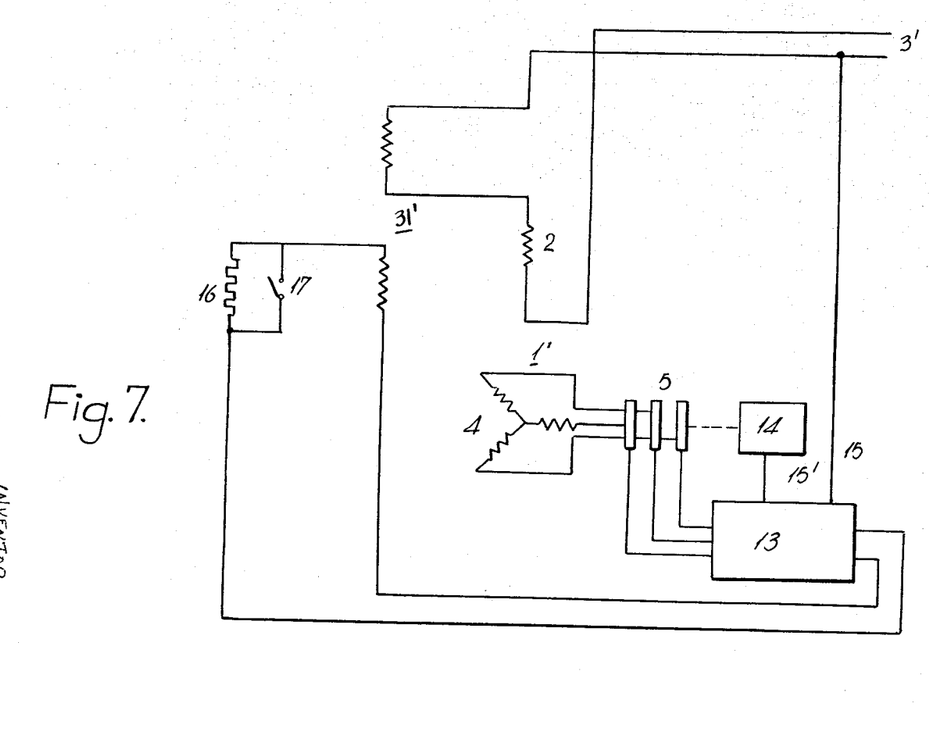

In another modification, the primary and secondary windings of the induction motor can be series connected as illustrated in FIG. 6 and control effected either by adjustment of the phase of the timing device, for example by handwheel 30 operating through a gear train, or by adjustment of the ratio of a variable ratio transformer 31 or equivalent interposed between the series connected primary and secondary windings. This latter embodiment, in which the supply frequency connections M will be seen to have connections thereto which put them effectively in series with the primary winding 2 of the motor 1, is also applicable to single phase equipments as illustrated in FIG. 7 in which the induction motor single phase primary winding 2 is supplied from the single phase supply system 3'.

Figure 8:
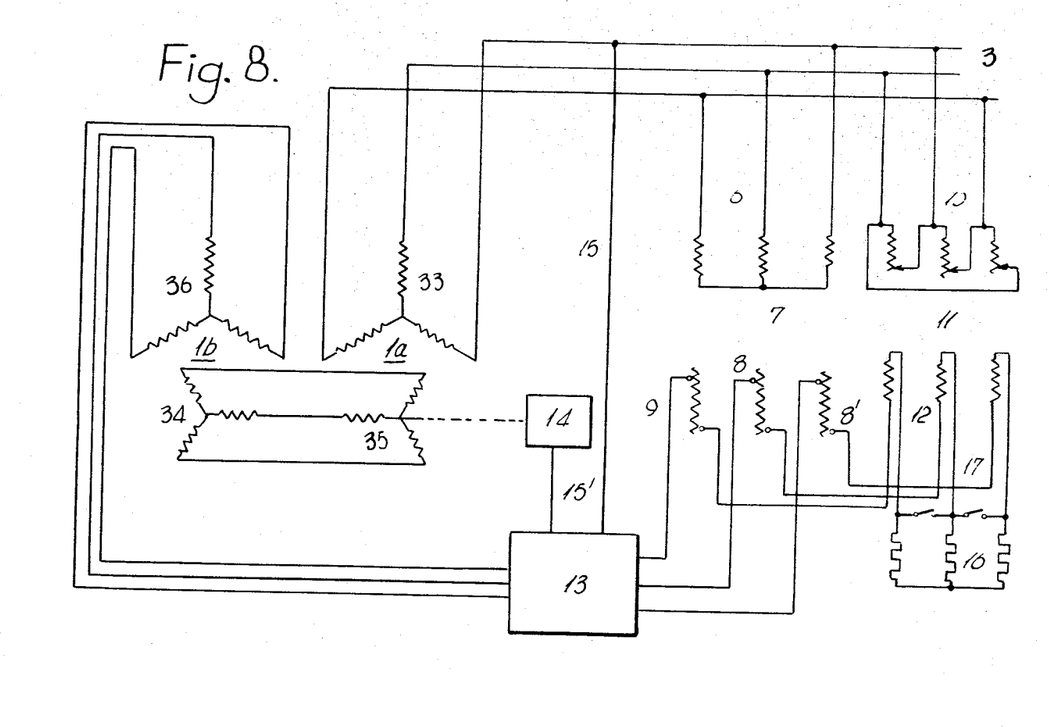

In the case of a polyphase induction motor it is possible to replace it by a combination of two induction motors 1a and 1b in cascade as illustrated in FIG. 8 in which the primary winding 33 of the motor 1a is connected to the alternating current supply 3 and is provided on its stator whereas the primary winding 34 of the other motor 1b is provided on its rotor and is connected to the secondary winding 35 of the first mentioned machine, connection to the frequency conversion circuit being made from the second machine's secondary winding 36 which is on its stator and therefore requires no sliprings for this connection.

Coming now to FIG. 9, the connections M and S in this figure represent on the one hand the connections extending between the frequency converting circuit 13 and the induction motor (1 or 1b) in the other figures, and on the other hand the connections extending between the converting circuit 13 and the supply system 3 via the transformer 7 or its substitutes. (For the arrangement of FIG. 7 there are only two connections S instead of three as shown in FIG. 9.) The frequency converting circuit 13 includes a pair of asymmetrically conductive electronic switching devices, such as d1, d1', between each of the connections M and each of the connections S, there being therefore a total of eighteen such devices (twelve for the arrangement of FIG. 7). These devices may for instance be semi-conductor trigger diodes (controlled semi-conductor rectifiers) or switching transistors. The two devices of each pair are connected with opposite polarity, so that by rendering the appropriate device conductive, current can be permitted to flow in either direction between any connection M and any connection S, that is, between any phase of the induction motor secondary winding and any phase of the variable transformer or its substitutes connected to the supply system. By appropriately timing the switching actions in dependence on the speed of rotation of the motor and on its number of poles it is therefore possible to effect the required frequency conversion between the supply frequency $f$ and the motor secondary current frequency $sf$ ($s$ being the motor slip as before). Thus considering a two-pole three-phase induction motor having three primary winding phase groups A, B and C and three secondary winding phase groups D, E and F as represented in FIG. 10, the relationship between the ampere-turns of, say, phase groups D and A at particular instant will be such that phase group D of the motor could be connected to the transformer secondary phase associated with phase group A of the motor. One third of a revolution later (or in general $1/n\phi$ revolution where $\phi$ is the number of supply phases and $n$ is the number of pole-pairs) there will be a similar relationship between phase group D and phase group B, and so on. The timing device 14 is therefore arranged to relate the switching on of the switching devices to the position of the motor rotor so as to establish these connections between phase groups at the appropriate times. To this end, referring again to FIG. 9, the timing device may comprise co-operating fixed conductive segments and rotating conductive segments so related in position that over the angle of rotation for which phase group D can be connected to the transformer secondary phase associated with phase group A for example, the segments $d$ will engage the segments $a$ and thereby establish connection from separate voltage sources to the triggering circuits (control circuits) of the two switching devices of the relevant pair. This will render one or other of these two devices conductive dependent on the polarity of the voltage across the devices at the instant of switching. It would be arranged, of course, that when one device is rendered conductive, the one previously conductive is switched off.

Although the foregoing arrangements permit speed control of the induction motor, it will be evident to those skilled in the art that similar arrangements will permit control of other factors, for example:

Variation of the load on a polyphase induction generator operating in parallel with a synchronous alternating current system;

Variation of the power factor of a polyphase induction motor or of an induction generator operating in parallel with a synchronous alternating current system;

Self-excitation of a polyphase induction generator.

It will also be evident to those skilled in the art that the arrangement is not limited to three-phase systems. Thus it may be advantageous for the induction machine secondary to have a winding of some other number of phases, with appropriate phase changing arrangements between the frequency conversion circuit and the alternating current system. Also the primary of the induction machine may, if desired, be located on the rotor.

Furthermore, the arrangement is applicable to schemes involving control of the primary voltage of the induction machine concurrently with speed adjustment. Thus for example, when a motor is driving a load such as a centrifugal pump it may be advantageous to boost the primary voltage at high speed when load torque is maximum and to reduce the primary voltage at low speed when load torque is a minimum.

What I claim is:

1. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, and connections to said supply frequency connections for causing injection of an auxiliary supply frequency voltage into said supply frequency connections to control the transfer of reactive volt-amperes at synchronous and non-synchronous speed.

2. In combination with an electric induction machine having primary and secondary windings, means for controlling the transfer of power and reactive volt-ampere between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, variable voltage means having a primary winding connected to said supply system and a secondary winding to which said supply frequency connections are connected, and voltage injecting means comprising a further winding connected in series with the last-mentioned secondary winding and inductively coupled to the supply system, the voltages in that secondary winding and in said further winding being out of phase with each other.

3. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply systems as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, a variable ratio transformer having a primary winding connected to the supply system and a secondary winding having tapping points movable equally and oppositely to one of which said supply frequency connections are connected, and voltage injecting means comprising a further winding connected to the other of said tapping points in series with the last-mentioned secondary winding and inductively coupled to the supply system, the voltages in that secondary winding and in the further winding being out of phase with each other.

4. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, an induction regulator having a primary winding connected to said supply system and a secondary winding to which said supply frequency connections are connected, and voltage injecting means comprising a further winding connected in series with the last-mentioned secondary winding and inductively coupled to the supply system.

5. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, a double induction regulator having a pair of primary windings connected to the supply system and a pair of secondary windings to which said supply frequency connections are connected, and voltage injecting means comprising a further winding connected in series with said pair of secondary windings and inductively coupled to the supply system.

6. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, a single induction regulator having a primary winding connected to said supply system and a secondary winding to which said supply frequency connections are connected, voltage injecting means comprising a winding connected in series with the last-mentioned secondary winding and inductively coupled to the supply system, and means for adjusting the relevant phasing of the timed sequential switching of the switching devices in the converter contemporaneously with adjustment of said regulator.

7. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, variable voltage means having a primary winding connected to the supply system and a secondary winding to which said supply frequency connections are connected, and voltage injecting means comprising an auxiliary transformer having a secondary winding connected in series with said secondary winding of the variable voltage means and a primary winding connected to the supply system.

8. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, variable voltage means having a primary winding connected to the supply system and a secondary winding to which the supply frequency connections are connected, and voltage injecting means comprising a further winding connected in series with the last-mentioned secondary winding, said further winding being provided on the induction machine along with the primary winding of the machine.

9. In combination with an electric induction machine having primary and secondary windings, means for controlling the transfer of power and reactive volt-amperes between the secondary winding of the machine and an alternating current supply system, said means comprising a plurality of static electronic switching devices connected between the secondary winding and said supply system as a frequency converter operable by timed sequential switching of said devices to effect frequency conversion between the supply system frequency and the frequency of the current in the secondary winding, means for effecting such timed sequential switching in accordance with the speed of the machine, slip frequency connections and supply frequency connections connecting said converter to the secondary winding and to the supply system respectively, a transformer having a primary winding connected to the supply system in series with the primary winding of the induction machine and a secondary winding to which the supply frequency connections to the converter are connected, the primary and secondary windings of the induction machine themselves being effectively connected in series.

10. In combination with a composite induction machine having first and second stator windings and interconnected first and second rotor windings cooperating respectively with said first and second stator windings, said first stator winding constituting a primary winding for the composite machine and the second stator winding constituting a secondary winding therefor, means for controlling the transfer of power and reactive volt-amperes between said secondary winding and an alternating current supply system comprising a plurality of static electronic switching devices connected between said secondary winding and said supply system as a frequency converter operable by timed sequential switching of said devices to effect frequency conversion between the supply system frequency and the frequency of the current in said secondary windings, means for effecting such timed sequential switching in accordance with the speed of the machine, slip frequency connections and supply frequency connections connecting said converter to said secondary winding and to the supply system respectively, variable voltage means having a primary winding connected to the supply system and a secondary winding to which the supply frequency connections to the converter are connected, and variable injecting means comprising a winding connected in series with the last-mentioned secondary windings and inductively coupled to the supply system.

References Cited by the Examiner

UNITED STATES PATENTS

| 2,122,273 | 6/1938 | Barwick | 318—197 |
| 2,236,984 | 4/1941 | Alexanderson | 318—237 X |
| 2,650,335 | 8/1953 | Leyton | 318—197 |

FOREIGN PATENTS

| 605,557 | 10/1925 | France. |
| 924,574 | 3/1955 | Germany. |

OTHER REFERENCES

German printed application A 19,554, November 8, 1956.

ORIS L. RADER, *Primary Examiner.*

C. E. ROHRER, G. Z. RUBINSON,
                    *Assistant Examiners.*